US011974113B2

(12) United States Patent
Degraye

(10) Patent No.: US 11,974,113 B2

(45) Date of Patent: Apr. 30, 2024

(54) SYSTEM AND METHODS FOR CINEMATIC HEADPHONES

(71) Applicant: HED Technologies Sarl, Geneva (CH)

(72) Inventor: Timothy Degraye, Geneva (CH)

(73) Assignee: HED Technologies SARL, Geneva (CH)

( * ) Notice: Subject to any disclaimer, the term of this patent is extended or adjusted under 35 U.S.C. 154(b) by 0 days.

(21) Appl. No.: 17/001,562

(22) Filed: Aug. 24, 2020

(65) Prior Publication Data

US 2021/0400412 A1 Dec. 23, 2021

Related U.S. Application Data

(60) Provisional application No. 63/040,368, filed on Jun. 17, 2020.

(51) Int. Cl.

*H04S 3/00* (2006.01)
*H04R 1/10* (2006.01)
*H04R 3/04* (2006.01)
*H04R 5/033* (2006.01)

(52) U.S. Cl.

CPC ........... *H04S 3/004* (2013.01); *H04R 1/1083* (2013.01); *H04R 3/04* (2013.01); *H04R 5/033* (2013.01); *A63F 2300/6063* (2013.01)

(58) Field of Classification Search

CPC ........... H04S 3/004; H04S 7/307; H04R 1/26; H04R 3/04; H04R 3/12; H04R 3/14; H04R 5/033; A63F 2300/6063
USPC .............. 381/303, 74, 26, 309, 311, 99, 384
See application file for complete search history.

(56) References Cited

U.S. PATENT DOCUMENTS 6,944,309 B2 * 9/2005 Terai ...................... H04R 5/033 381/309
6,990,210 B2 * 1/2006 Cheng ...................... H04S 3/00 381/17
7,463,748 B2 * 12/2008 Yang ................... H04R 1/1075 381/370
9,554,215 B2 * 1/2017 Wei ...................... H04R 1/1091
10,462,593 B2 * 10/2019 Robertson ................. H04S 3/02
10,687,145 B1 * 6/2020 Campbell ........ G10K 11/17821
2002/0006206 A1 * 1/2002 Scofield .................. H04S 3/002 381/27

(Continued)

*Primary Examiner* — Xu Mei
(74) *Attorney, Agent, or Firm* — Tsircon Law PC

(57) ABSTRACT

A cinema system comprises video equipment configured to generate video images from video data for presentation on a screen; a headphone system including left and right ear cups, each including at least one driver configured to drive highs and/or mids based on headphone sound signals and not configured to drive lows; a first DAC configured to convert audio data based on the headphone sound data to the headphone sound signals; and a control system configured to generate the audio data from at least headphone sound data; one or more low-frequency speakers configured to drive lows based on low-frequency speaker signals; a second DAC configured to generate the low-frequency speaker signals from low-frequency speaker data; and a server system configured to assist in providing the video data to the video equipment, the headphone sound data to the one or more headphone systems, and the low-frequency speaker data to the second DAC.

20 Claims, 9 Drawing Sheets

(56) References Cited

U.S. PATENT DOCUMENTS

| | | | | |
|---|---|---|---|---|
| 2005/0041816 | A1* | 2/2005 | Cheng | H04S 3/00 381/26 |
| 2006/0193482 | A1* | 8/2006 | Harvey | H04R 5/00 381/74 |
| 2008/0118078 | A1* | 5/2008 | Asada | H04S 3/008 381/74 |
| 2014/0016796 | A1* | 1/2014 | Maust | H04R 1/1091 381/74 |
| 2014/0044275 | A1* | 2/2014 | Goldstein | H04R 1/1083 381/71.6 |
| 2015/0319518 | A1* | 11/2015 | Wilson | H04R 1/10 381/71.6 |
| 2016/0112791 | A1* | 4/2016 | Leary | H04R 27/00 381/309 |

* cited by examiner

SYSTEM AND METHODS FOR CINEMATIC HEADPHONES

CROSS REFERENCE TO RELATED APPLICATIONS

The present application is a nonprovisional of and claims the benefit of U.S. Provisional Application Ser. No. 63/040,368, filed Jun. 17, 2020, entitled "System and Methods for Cinematic Headphones," which is hereby incorporated by reference.

TECHNICAL FIELD

This invention relates generally to headphones, and in some embodiments provides systems and methods for using headphones in a movie theater environment.

BACKGROUND

For well over 100 years, attending a motion picture screening in a theater has been a showcase for the latest in entertainment technology. The motion picture industry is continuously innovating and rolling out new methods for making the audio and visual aspects of "movie magic" more realistic and immersive, not to mention worth the price of a ticket.

Many movie patrons enjoy going to the cinema to watch movies on a large screen with friends and family, happily consuming popcorn, candy, and drinks while perhaps sharing their thoughts and opinions on the film. Of course, some movie patrons find themselves annoyed by the rustling noises and conversations of their neighbors. Some of these movie patrons would enjoy the experience more if they could hear the film's soundtrack without any distracting noises around them.

Further, theaters often install elaborate full-range speaker arrays and turn the volume high in order to offer movie patrons an immersive audio experience. However, some movie patrons find the sound too loud. Others with hearing difficulties may not want the sound volume reduced.

Additionally, with constant advances in home theater technology, including the increased affordability of large-screen monitors and high-end surround sound systems for the home, movie theaters need innovative new methods of processing and delivering better and more immersive sound to patrons, so that the cinematic experience continues to be vastly superior to that which consumers could otherwise enjoy in their own homes.

SUMMARY

Implementing one or more of the teachings herein, movie theaters may choose to provide special headphones to movie patrons to augment the movie experience. In some embodiments, the special headphones provided by the movie theaters may be equipped with high-frequency and/or mid-range drivers, and the theater environment may be equipped with one or more low-frequency speakers such as subwoofers. The special headphones in combination with the low-frequency speakers can create a full audio experience for the movie patrons to enjoy. Because the special headphones are not equipped with low-frequency drivers, the special headphone will not offer full dynamic range outside of the theater environment, greatly reducing the risk of theft by movie patrons after the screening has been completed.

In some embodiments, the special headphones may be equipped with volume control so that the movie patron can control sound volume, e.g., of the highs and/or mids being played on the special headphones. Accordingly, movie patrons who enjoy a loud experience can increase the volume, and movie patrons who enjoy a quieter experience can lower the volume.

In some embodiments, the special headphones may be equipped with noise reduction and/or cancellation filters. In some embodiments, the filters may be configured specifically to reduce and/or cancel conventional movie theater noises, such as those caused by people talking, eating popcorn, opening candy wrappers, etc. In some embodiments, the special headphones may be equipped with noise reduction/cancellation level control, so that the movie patron can control the amount of noise cancellation. That way, movie patrons who enjoy hearing conventional theater noises or who wish to speak with a neighbor can do so, and movie patrons who want to reduce and/or cancel the conventional theater noises can increase the level of the noise reduction/cancellation. In some embodiments, the special headphones may receive low-frequency sound data corresponding to the low-frequency speakers, so that the special headphones can reduce and/or cancel noise without reducing and/or cancelling the desired low-frequency sounds emanating the low-frequency speakers.

In some embodiments, the special headphones may include systems to monitor head direction in the environment. For example, the movie theater may be equipped with directional transponders in one or more locations in the room. The special headphones may be equipped with monitors to capture ping information from the directional transponders to determine head direction. Based on the head direction, the special headphones can create exciting effects. For example, using head direction information, the special headphones can increase the volume to the right ear and lower the volume to the left ear when the movie patron turns left (such that his right hear is pointing towards the sound stage) and can increase the volume to the left ear and lower the volume to the right ear when the movie patron turns right (such that his left hear is pointing towards the sound stage).

In some embodiments, the special headphones may include dedicated pairing algorithms that enable the special headphones only to pair with servers in the movie theater environment. In some embodiments, the special headphones may include dedicated encryption processes to encrypt communications so that the special headphones can only communicate with the server systems in the movie theater environment (and so that no one can easily capture the sound data). Using dedicated pairing algorithms and/or dedicated encryption processes, the special headphones may be rendered useful only in the movie theater environment, and thus rendered to have little to no value outside the environment. Accordingly, this may reduce the likelihood of theft.

In some embodiments, the special headphones may include the capability to recognize digital hashes of the audio soundtrack for a specific film, and may be programmable to only allow the special headphones to pair with servers playing that specific film in specific movie theater at a specific time. Using digital hash/time and date authorization, the special headphones may be rendered useful only in a pre-determined cinema environment and at a set time. This may reduce the likelihood of theft and may deter legitimate patrons of the cinema from attending additional showings of films for which they have not purchased a ticket.

To protect the health of movie patrons, the movie theater may include ear cup covers (protectors) and/or headphone covers (protectors).

It will be appreciated that the teachings described herein can support pure audio environments (that is, environments without video). It will be further appreciated that the teachings described herein can support residential systems or systems outside of the movie theater environment.

In some embodiments, the present invention provides a cinema system, comprising a screen; video equipment configured to generate video images for presentation on the screen, the video images being based on video data; one or more headphone systems, each headphone system including left and right ear cups, each ear cup including at least one driver configured to drive highs and/or mids based on headphone sound signals and not configured to drive lows, each ear cup not including a low-frequency driver or a dynamic driver configured to provide lows, the headphone sound signals corresponding to the video; a first digital to analog converter configured to convert audio data based on the headphone sound data to the headphone sound signals; and a control system configured to generate the audio data from at least headphone sound data; one or more low-frequency speakers configured to drive lows based on low-frequency speaker signals; a second digital to analog converter configured to generate the low-frequency speaker signals from low-frequency speaker data; and a server system configured to assist in providing the video data to the video equipment, the headphone sound data to the one or more headphone systems, and the low-frequency speaker data to the second digital to analog converter.

The screen and the video equipment may be parts of a smart television. The video equipment may include a projector. The video equipment may include a set top box. The video equipment may be part of the server system. The one or more low-frequency speakers may include one or more subwoofers. The second digital to analog converter may be located in at least one or more low-frequency speakers. The second digital to analog converter may be located at the server system. At least one of the one or more headphone systems may include one or more hardware controls configured to control volume of the highs and/or mids. The server system and each of the one or more headphone systems includes a communications interface configured to assist in pairing the one or more headphone systems to the server system. The communications interface on each of the one or more headphone systems may be configured only to pair with the server system. The server system and each of the one or more headphone systems may include an encryption engine configured to assist in encrypting data communications between the one or more headphone systems and the server system. The encryption engine on each of the one or more headphone system may be configured only to encrypt the data communications using an encryption key dedicated to the server system.

In some embodiments, the present invention may include a method, comprising retrieving video data; generating video images based on the video data for presentation on a screen in a cinema environment; retrieving headphone sound data; transmitting the headphone sound data to one or more headphone systems located in the cinema environment, the one or more headphone systems including left and right ear cups, each ear cup including at least one driver configured to drive highs and/or mids based on headphone sound signals and not configured to drive lows, each ear cup not including a low-frequency driver or a dynamic driver configured to provide lows, the headphone sound signals corresponding to the video; a first digital to analog converter configured to convert audio data to the headphone sound signals; and a control system configured to generate the audio data from at least headphone sound data; retrieving low-frequency sound data; transmitting the low-frequency sound data to a second digital to analog converter configured to generate low-frequency speaker signals from the low-frequency speaker data, the low-frequency sound signals corresponding to the video; and transmitting the low-frequency speaker signals to one or more one or more low-frequency speakers configured to drive lows based on the low-frequency speaker signals.

The second digital to analog converter may be located in at least one or more low-frequency speakers. The second digital to analog converter may be located at a server system remote from the one or more low-frequency speakers. The method may further comprise pairing the one or more headphone systems to a server system that performs the transmitting the headphone sound data. The method may further comprise enabling the one or more headphone systems to pair with only the server system. The method may further comprise encrypting data communications between the one or more headphone systems and a server system. The method may further comprise enabling the one or more headphone systems to encrypt the data communications using an encryption key dedicated to the server system.

DETAILED DESCRIPTION

Figure 1:
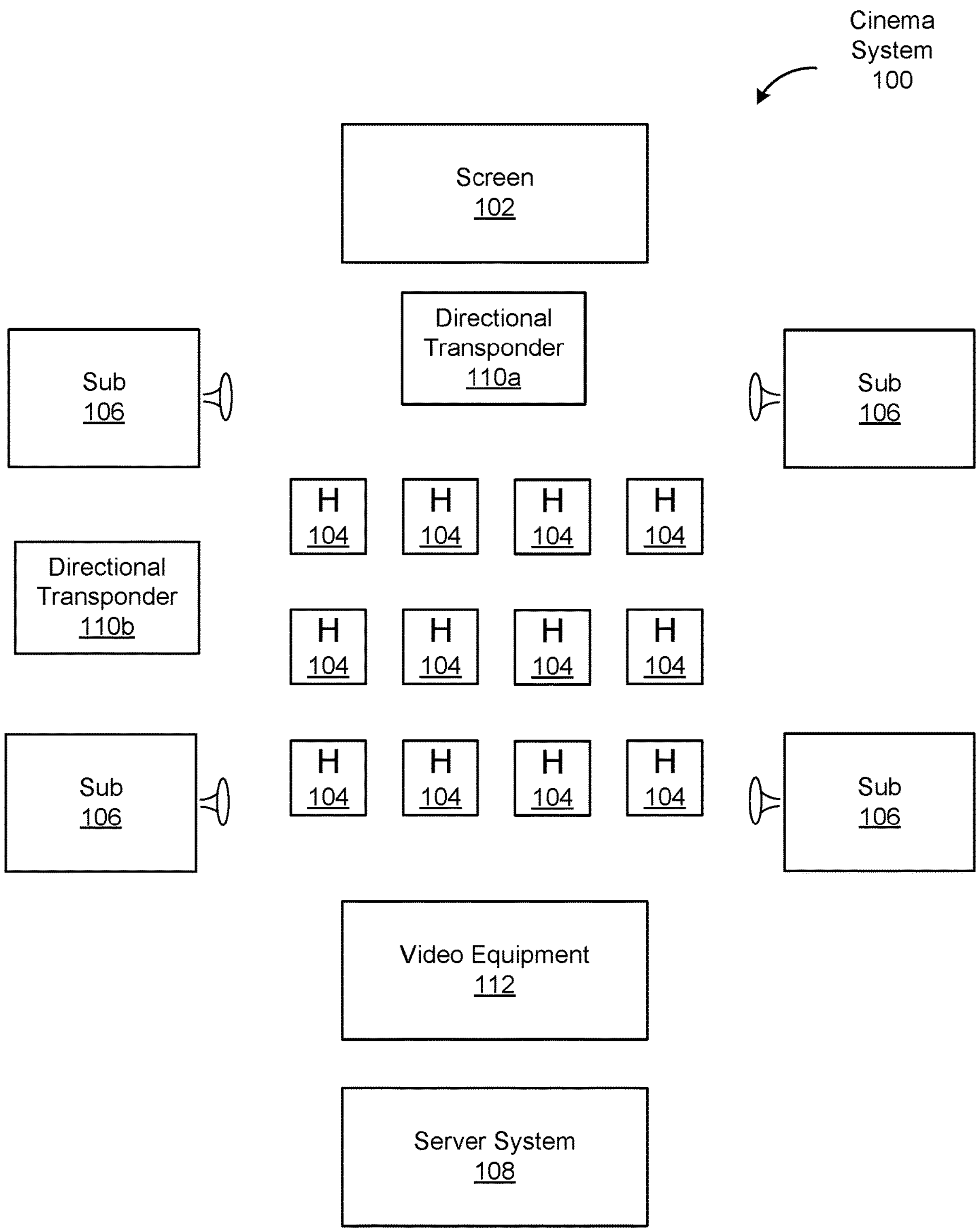
FIG. 1 is a block diagram of a cinema system, in accordance with some embodiments of the present invention.

The following description is provided to enable a person skilled in the art to make and use various embodiments of the invention. Modifications are possible. The generic principles defined herein may be applied to the disclosed embodiments and other embodiments without departing from the spirit and scope of the invention. Any claims are not intended to be limited to the embodiments disclosed, but are to be accorded the widest scope consistent with the principles, features and teachings herein.

Implementing one or more of the teachings herein, movie theaters may choose to provide special headphones to movie patrons to augment the movie experience. In some embodiments, the special headphones provided by the movie theaters may be equipped with high-frequency and/or mid-range drivers, and the theater environment may be equipped with one or more low-frequency speakers such as subwoofers. The special headphones in combination with the low-frequency speakers can create a full audio experience for the movie patrons to enjoy. Because the special headphones are not equipped with low-frequency drivers, the special headphone will not offer full dynamic range outside of the theater environment, greatly reducing the risk of theft by movie patrons after the screening has been completed.

In some embodiments, the special headphones may be equipped with volume control so that the movie patron can control sound volume, e.g., of the highs and/or mids being played on the special headphones. Accordingly, movie patrons who enjoy a loud experience can increase the volume, and movie patrons who enjoy a quieter experience can lower the volume.

In some embodiments, the special headphones may be equipped with noise reduction and/or cancellation filters. In some embodiments, the filters may be configured specifically to reduce and/or cancel conventional movie theater noises, such as those caused by people talking, eating popcorn, opening candy wrappers, etc. In some embodiments, the special headphones may be equipped with noise reduction/cancellation level control, so that the movie patron can control the amount of noise cancellation. That way, movie patrons who enjoy hearing conventional theater noises or who wish to speak with a neighbor can do so, and movie patrons who want to reduce and/or cancel the conventional theater noises can increase the level of the noise reduction/cancellation. In some embodiments, the special headphones may receive low-frequency sound data corresponding to the low-frequency speakers, so that the special headphones can reduce and/or cancel noise without reducing and/or cancelling the desired low-frequency sounds emanating the low-frequency speakers.

In some embodiments, the special headphones may include systems to monitor head direction in the environment. For example, the movie theater may be equipped with directional transponders in one or more locations in the room. The special headphones may be equipped with monitors to capture ping information from the directional transponders to determine head direction. Based on the head direction, the special headphones can create exciting effects. For example, using head direction information, the special headphones can increase the volume to the right ear and lower the volume to the left ear when the movie patron turns left (such that his right hear is pointing towards the sound stage) and can increase the volume to the left ear and lower the volume to the right ear when the movie patron turns right (such that his left hear is pointing towards the sound stage).

In some embodiments, the special headphones may include dedicated pairing algorithms that enable the special headphones only to pair with servers in the movie theater environment. In some embodiments, the special headphones may include dedicated encryption processes to encrypt communications so that the special headphones can only communicate with the server systems in the movie theater environment (and so that no one can easily capture the sound data). Using dedicated pairing algorithms and/or dedicated encryption processes, the special headphones may be rendered useful only in the movie theater environment, and thus rendered to have little to no value outside the environment. Accordingly, this may reduce the likelihood of theft.

In some embodiments, the special headphones may include the capability to recognize digital hashes of the audio soundtrack for a specific film, and may be programmable to only allow the special headphones to pair with servers playing that specific film in specific movie theater at a specific time. Using digital hash/time and date authorization, the special headphones may be rendered useful only in a pre-determined cinema environment and at a set time. This may reduce the likelihood of theft and may deter legitimate patrons of the cinema from attending additional showings of films for which they have not purchased a ticket.

To protect the health of movie patrons, the movie theater may include ear cup covers (protectors) and/or headphone covers (protectors).

It will be appreciated that the teachings described herein can support pure audio environments (that is, environments without video). It will be further appreciated that the teachings described herein can support residential systems or systems outside of the movie theater environment.

FIG. 1 is a block diagram of a cinema system 100, in accordance with some embodiments of the present invention. The cinema system 100 includes a screen 102, a plurality of headphone systems 104, one or more subwoofers 106 (or other low-frequency range speakers), a server system 108, one or more directional transponders 110, and video equipment 112. The cinema system 100 may be located in a movie theater having an array of seats where movie patrons sit. Each of the movie patrons may be equipped with one of the headphone systems 104 (labelled as "H" in FIG. 1). The one or more subwoofers 106 may be positioned anywhere in the room, e.g., at the corners, at various locations on the walls, in the aisles, and/or under the seats. The server system 108 may be wired or wirelessly coupled to each of the headphone systems 104, to each of the subwoofers 106, to the one or more directional transponders 110, to the video equipment 112, and/or to the screen 102.

In some embodiments, the video equipment 112 includes a projector for projecting video images onto the screen 102. In some embodiments, the video equipment 112 includes a digital playback device where the screen 102 is a display device. In some embodiments, the video equipment 112 includes the screen 102, such as with a smart television. In some embodiments, the video equipment 112 is part of the server system 108. In some embodiments, the video equipment 112 is independent of the screen 102 and the server system 108, such as with a Roku™, cable or AppleTV™ set top box. The server system 108 transmits the video data over wire or wirelessly to the video equipment 112, which is configured to generate video images from the video data and present the video images on the screen 102.

Each of the headphone systems 104 may be wired or wirelessly coupled to the server system 108. In some embodiments, each of the headphone systems 104 may be coupled to a port located on the seat, which is wired to the server system 108. Each of the headphone systems 104 may be configured to receive headphone sound (audio) data from the server system 108 for processing and playback. In some embodiments, the headphone systems 104 are equipped with only one or more drivers capable of handling highs (e.g., sounds above about 2,000 Hz) and/or capable of handling mids (e.g., sounds between about 200 Hz and 2,000 Hz), but not capable of handling lows (e.g., sounds below about 200 Hz), because the cinema system 100 may configure the subwoofers 106 located in the room to provide the lows to the audience. In some embodiments, the headphone systems

104 will be open back, so that the ambient subwoofer audio will be better heard. In some embodiments, the headphone systems 104 will not be not equipped with a dynamic driver capable of providing the lows, so that the headphones systems 104 are incapable of providing the lows. In some embodiments, the one or more drivers includes one or more high-frequency (e.g., tweeter) drivers and one or more mid-range-frequency drivers. By including one or more drivers to generate only highs and mids on the headphone systems 104, movie patrons may be less apt to steal the headphone systems 104, since the headphone systems 104 would provide less desirable sound quality outside of the theater.

In some embodiments, the headphone systems 104 may be configured to process only sound data encrypted using a particular key, sound data provided in a proprietary format, sound data from a server system 108 that has the proprietary pairing mechanism to pair with the headphone systems 104, and/or sound data received using another designated communication interface, so that the headphones 104 have little to no use outside of the cinema system 100, e.g., outside of the movie theater environment or the environment with the server system 108 capable of communicating with the headphone systems 104. Accordingly, in some embodiments, the headphone systems 104 may include one or more drivers capable of generating lows, although only in the environment of the cinema system 100. The headphone systems 104 may be configured to recognize digital hashes of the audio soundtrack for a specific film, and may be programmable to only allow the special headphones to pair with servers systems playing that specific film in specific movie theater at a specific time. Using digital hash/time and date authorization, the headphone systems 104 may be rendered useful only in a pre-determined cinema environment and at a set time. This may reduce the likelihood of theft and may deter legitimate patrons of the cinema from attending additional showings of films for which they have not purchased a ticket.

Each headphone system 104 may be configured with noise filters to manage active or passive noise cancellation or reduction. Each headphone system 104 may be equipped with an ambient microphone configured to capture noises proximate to the wearer, such as conventional movie theater noises involving popcorn, candy wrappers, slurping, talking, etc. In some embodiments, each of the headphone systems 104 may include noise cancellation/reduction filters particularly configured for the conventional movie theater noises. In some embodiments, each of the headphone systems 104 may include noise cancellation/reduction filters that account for the known lows emanating from the subwoofers 106. In some embodiments, the server system 108 may provide the subwoofer sound data to the headphone systems 104 for the purpose of enabling the noise cancellation/reduction filters to avoid unwanted cancellation/reduction of the known subwoofer lows.

Each of the headphone systems 104 may also be equipped with head-direction monitors and processing. In some embodiments, the cinema system 100 may use directional transponders 110*a* and 110*b*. The directional transponders 110*a* and 110*b* may be located in known positions and provide directional ping signals to the headphone systems 104, so that the headphone systems 104 can determine head direction relative to the known position of the directional transponders 110*a*/110*b*. By identifying head direction, the headphone systems 104 can process the headphone sound data to control the direction of sound presented to the wearer. For example, if a voice from a movie is intended to come from front stage and the wearer is facing the front stage, then the headphone system 104 may adjust the sound signals to the left and right speakers to present the sound more evenly between the left and right speakers of the headphone system 104. If the voice is intended to come from the front stage, and the wearer is facing left, then the headphone system 104 may adjust the sound signals to the left and right speakers to increase the sound volume to the right speaker and reduce the sound volume to the left speaker. The headphone system 104 may adjust the sounds in other ways, such as by modifying timing, frequency, etc. Although the cinema system 100 is being shown to use two transponders 110*a*/110*b*, one will recognize that the cinema system 100 could be implemented with only one transponder or with more than two. Further, although the cinema system 100 is being shown to use transponders, one will recognize that the cinema system 100 could be implemented to use additional or alternative mechanisms, such as compasses, gyroscopes, accelerometers, infrared devices and/or the like. It will be appreciated that the head-direction monitors and direction transponders 110*a*/110*b* may be used to add determine user position information, such as the position of the user in the room. In some embodiments, the users position in the room may be used to modify the headphone sound data to create additional effects, such as whether one user can hear certain noise and another user cannot hear the certain noise.

Each of the headphone systems 104 can be equipped with volume control to enable the wearer to adjust headphone volume as desired. Further, each of the headphone systems 104 can be equipped with noise cancellation/reduction control to enable the wearer to adjust the amount of noise cancellation/reduction as desired. For example, perhaps a wearer wishes to hear the conventional movie theater noises as part of the theater-going experience. Perhaps the wearer wishes to hear the voice of a person sitting nearby, e.g., a friend or child. By enabling a wearer to control the amount of noise cancellation/reduction, the wearer can still choose to listen to the ambient noise and the movie audio.

Figure 2:
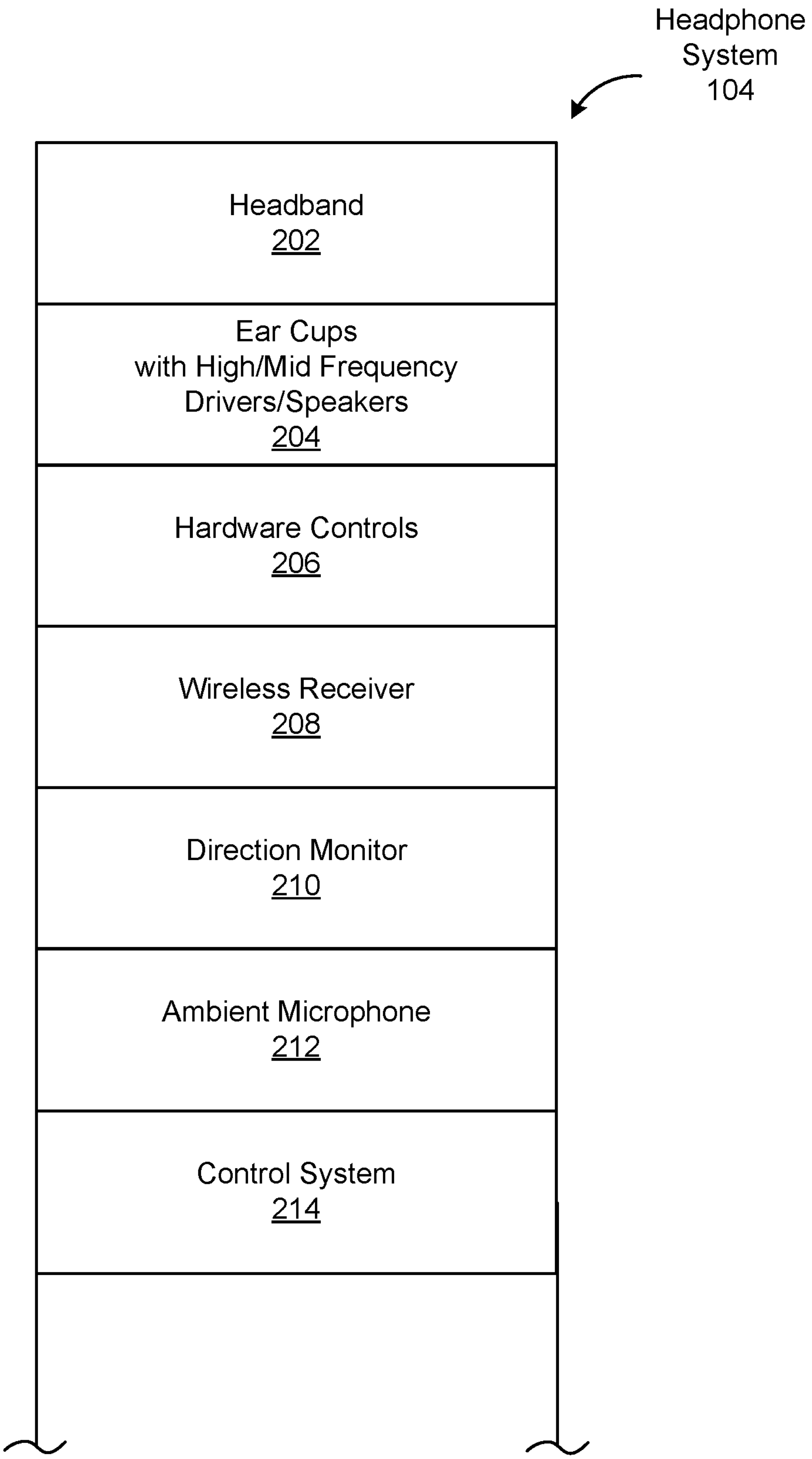
FIG. 2 is a block diagram of a headphone system, in accordance with some embodiments of the present invention.

FIG. 2 is a block diagram illustrating details of the headphone system 104, in accordance with some embodiments of the present invention. The headphone system 104 includes a headband 202, ear cups 204, hardware (and/or software) controls 206, a wireless receiver 208, a direction monitor 210, an ambient microphone 212, and a control system 214. Many of these elements are optional, including the hardware (and/or software) controls 206, the wireless receiver 208 (which may be replaced with a wire and associated circuitry), the direction monitor 212, and the ambient microphone 214.

The headband 202 may include a conventional headband configured to support the ear cups 204, to support the headphone system components, to resiliently hug the head of the wearer and to position the ear cups 204 over the wearer's ears.

The ear cups 204 may be equipped with one or more drivers/speakers to support highs and mids only. In some embodiments, the one or more drivers may include only one or more tweeter drivers. In some embodiments, the one or more drivers may include only one or more mid-range drivers. In some embodiments, the one or more drivers may include one or more semi-dynamic drivers capable of supporting both highs and mids, but not lows. In some embodiments, the one or more drivers may include one tweeter driver and two mid-range drivers. In some embodiments, the one or more drivers may include an array of tweeters and mid-range drivers to enhance the audio experience. In some embodiments, the one or more drivers may include drivers capable of supporting lows, such as an embodiment where it is desirable for the headphone systems 104 to be used in other ways, e.g., in embodiments outside of the cinema system 104 such as at home, in embodiments where the headphone systems 104 can only work with the server system 108, etc. The ear cups 204 may include cushioned padding for wearer comfort.

The hardware (and/or software) controls 206 may include volume control, noise cancellation/reduction control, and other control such as power buttons, pairing buttons, frequency controls, etc. In some embodiments, the controls 206 may be controlled through an application, e.g., on a smart phone or personal device.

The wireless receiver 208 may be configured to receive sound data from the server system 108. The sound data may include the headphone sound data (i.e., the sound data for generating the highs and mids for the left and right speakers in the ear cups 204). The sound data may also include the subwoofer sound data for supporting noise cancellation/reduction processes.

The direction monitor 210 may include one or more receivers (or transceivers) configured to receive the transponder ping signals.

The ambient microphone 212 may include a directional or omnidirectional microphone configured to capture ambient sounds proximate to the wearer. As stated above, these ambient sounds may include popcorn sounds, candy wrapper sounds, slurping, talking, etc.

The control system 214 includes hardware, software and/or firmware configured to process the data and/or signals received to generate headphone sound signals to drive the speakers in the ear cups 204. The control system 214 may generate the headphone sound signals based on the headphone sound data received from the server system 108, based on the noise data generated from the noise signals received from the ambient microphone 212, based on the subwoofer sound data received from the servers system 108, based on direction data generated from the transponder ping signals from the direction monitor 210, based on the control signals received from the hardware (and/or software) controls 206, and/or the like. In some embodiments, the control system 214 may receive the headphone sound data from the server system 108 to generate left and right speaker sound signals. In some embodiments, the control system 214 may modify the left and right speaker sound signals to cancel/reduce ambient sounds captured by the ambient microphone 212. In some embodiments, the control system 214 may control the amount of noise cancellation/reduction to the left and right sounds signals based on the settings of the hardware (and/or software) controls. In some embodiments, using the subwoofer sound data, the control system 214 may apply the noise cancellation/reduction to the left and right speaker sound signals without reducing the subwoofer sounds captured by the ambient microphone 212. In some embodiments, the control system 214 may modify the left and right speaker sound signals using the transponder ping signals to account for head direction and/or user room position. The control system 214 may generate processed audio data from one or more of these processes, which is provided to a digital to analog converter (DAC) to generate the headphone sound signals used to drive the left and right speakers on the headphone system 104.

Figure 3:
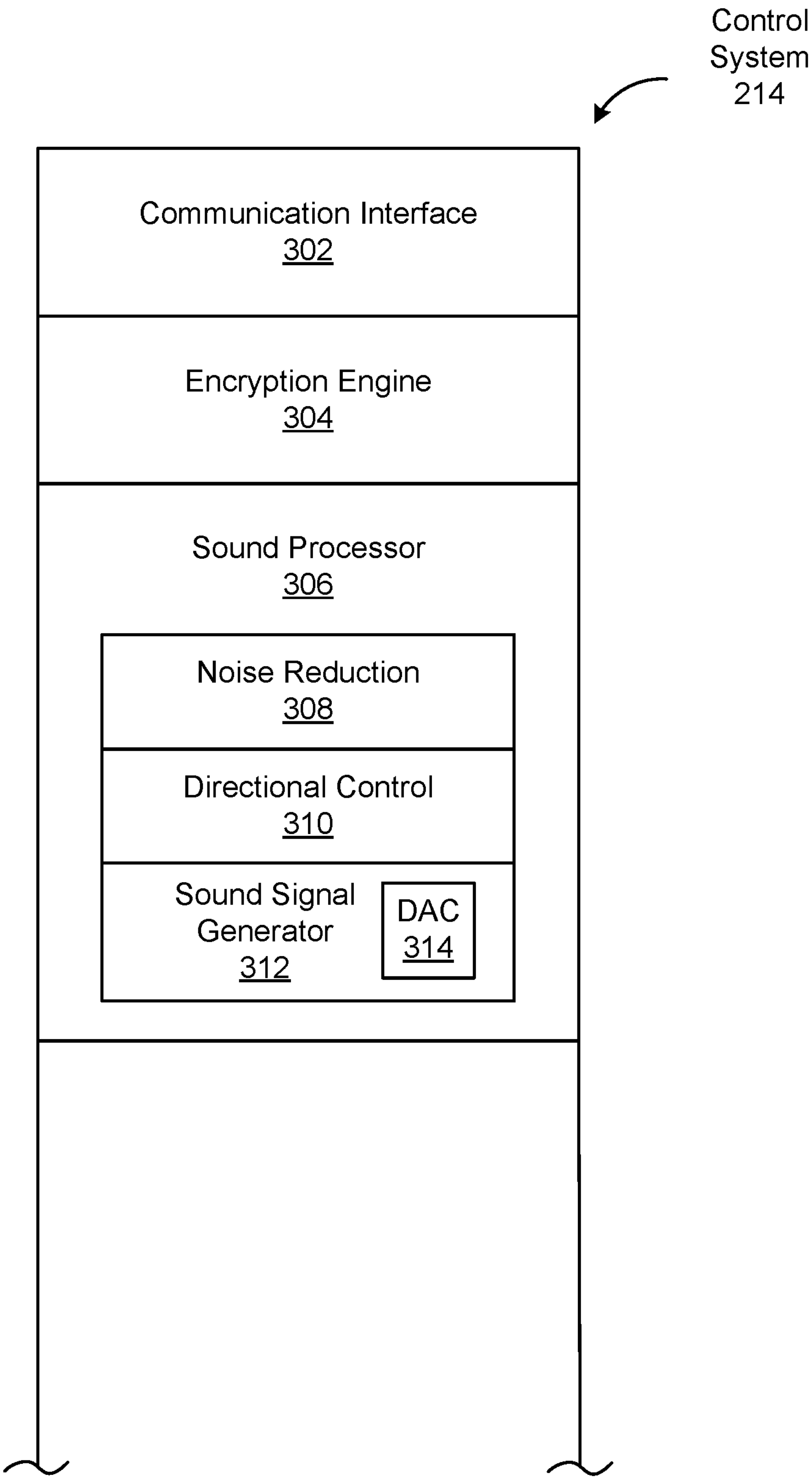
FIG. 3 is a block diagram of a control system, in accordance with some embodiments of the present invention.

FIG. 3 is a block diagram of a control system 214, in accordance with some embodiments of the present invention. The control system 214 may include a communications interface 302, an encryption engine 304, and a sound processor 306. The sound processor 306 may include a noise cancellation/reduction engine 308, a directional control engine 310, and a sound signal generator 312. The sound signal generator 312 may include a headphone DAC 314 to convert the digital sound data to analog sound signals that drive the drivers in the ear cups 204. Many of these elements are optional, including the encryption engine 304, the noise cancellation/reduction engine 308, and/or the direction control engine 310.

The communications interface 302 includes hardware, software and/or firmware configured in some embodiments to pair the headphone system 104 with the server system 108, in some embodiments to use digital hashes, date and time information, and/or other information to support limited connectivity to particular establishments, particular theaters, particular movie, particular movie screenings, etc., and in some embodiments to communicate with the server system 108 using encryption to ensure that the headphone system 104 is useful only in the cinema system 100 (e.g., the movie theater or particular environment). The communications interface 302 may cooperate with the encryption engine 304, which may use encryption and decryption processes to support communication with the server system 108. In some embodiments, the encryption engine 304 may use public/private key cryptography to enable the headphone systems 104 only to communicate with the server system 108. Other communications methods are also possible, including processes without encryption.

The sound processor 306 generates the left and right speaker signals described above. The noise cancellation/reduction engine 308 therein may modify the left and right speaker sounds data using digital filters or the left and right speaker sound signals using analog filters to cancel/reduce ambient sounds captured by the ambient microphone 212. In some embodiments, the noise cancellation/reduction engine 308 may be configured to specialize in noise cancellation/reduction of conventional movie theater sounds. In some embodiments, the noise cancellation/reduction engine 308 may provide an amount of noise cancellation/reduction based on the settings of the hardware (and/or software) controls. In some embodiments, the noise cancellation/reduction engine 308, using the subwoofer sound data received from the server system 108, may filter the noise from the left and right speaker sound data or left and right speaker sound signals without filtering the subwoofer sounds captured by the ambient microphone 212. In some embodiments, the directional control engine 310 may modify the left and right speaker sound data or left and right speaker sound signals using the transponder ping signals to account for head position. The sound signal generator 312 may generate the left and right speaker sound signals based on the sound data received, based on the modifications generated by the noise reduction/cancellation engine 308, based on the modifications by the directional control engine 310, and/or based on other hardware (and/or software) controls available.

Figure 4:
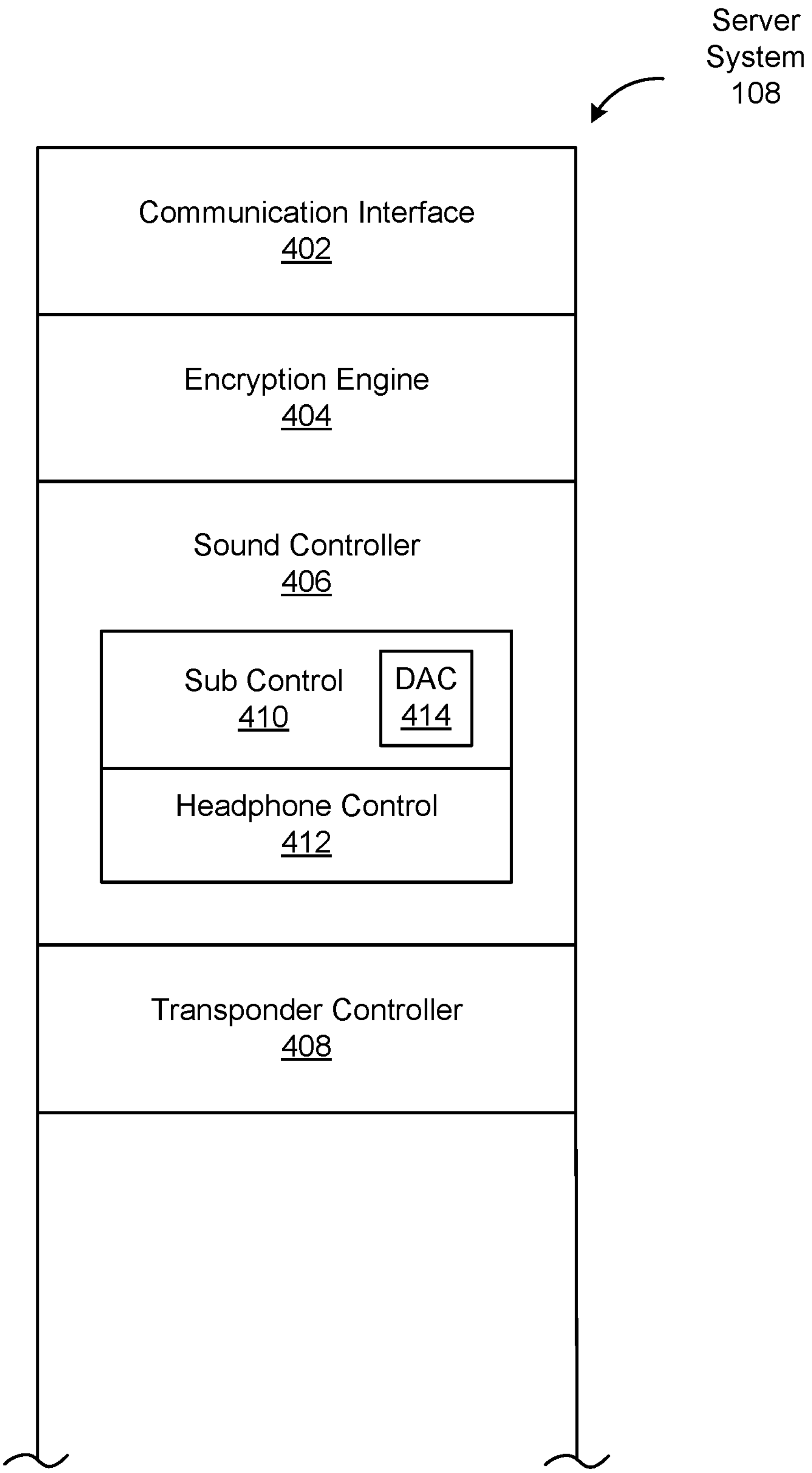
FIG. 4 is a block diagram of a server system, in accordance with some embodiments of the present invention.

FIG. 4 is a block diagram of a server system 108, in accordance with some embodiments of the present invention. The server system 108 includes a communication interface 402, an encryption engine 404, a sound controller 406, and a transponder controller 408. Many of these elements are optional, including the encryption engine 404 and the transponder controller 408.

In some embodiments, the communication interface 402 includes hardware, software and/or firmware configured in some embodiments to pair the server system 108 with the headphone system 104, in some embodiments to use digital hashes, date and time information, and/or other information to support limited connectivity of the headphone systems 104 to particular establishments, particular theaters, particular movie, particular movie screenings, etc., and/or to communicate with the headphone systems 104 possibly using encryption to ensure that the headphone system 104 is useful only in the cinema system 100 (e.g., the movie theater or particular environment). The communications interface 402 may cooperate with the encryption engine 404, which may use encryption and decryption processes to support communication with the headphone systems 104. In some embodiments, the encryption engine 404 may use public/private key cryptography to enable the headphone systems 104 only to communicate with the server system 108. Other communications methods are also possible, including processes without encryption.

The transponder controller 408 includes hardware, software and/or firmware configured to control the transponders 110*a*/110*b* to send transponder ping signals to the headphone systems 104 in order to enable the headphone systems 104 to determine head direction. The transponder controller 408 may be replaced with or supported by another directional controller, e.g., an infrared signal controller, to assist the headphone systems 104 to determine head direction. In some embodiments, the directional transponders 110 operate independently, and the server system 108 does not include a transponder controller 408.

The sound controller 406 includes hardware, software and/or firmware configured to send the sound data to the headphone systems 104 and to send the subwoofer sound data or subwoofer sound signals to the subwoofers 106. In some embodiments, the sound controller 406 includes a subwoofer controller 410 and a headphone controller 412.

In some embodiments, the subwoofer controller 410 includes a digital to analog converter (subwoofer DAC) 414 as well as other hardware, software and/or firmware. In such embodiments, the subwoofer controller 410 may be configured to obtain subwoofer sound data, configured to generate the subwoofer sound signals from the subwoofer sound data, and configured to send the subwoofer sound signals to the subwoofers 106, which use the subwoofer sound signals to generate the subwoofer audio.

In some embodiments, the subwoofers 106 include the subwoofer DAC 414. In such embodiments, the subwoofer controller 410 may be configured to obtain and send the subwoofer sound data to the subwoofers 106, which use the subwoofer sound data and the subwoofer DAC 414 to generate the subwoofer sound signals to generate the subwoofer audio.

The headphone controller 412 includes hardware, software and/or firmware configured to obtain and send headphone sound data to the headphone systems 104, which use the headphone sound data to generate the headphone audio on the headphone systems 104. In some embodiments, the headphone sound data includes the left and right speaker sound data. In some embodiments, the headphone sound data also includes the subwoofer sound data, which the headphone system 104 uses to support noise cancellation/reduction without cancelling/reducing the wanted subwoofer audio.

Figure 5:
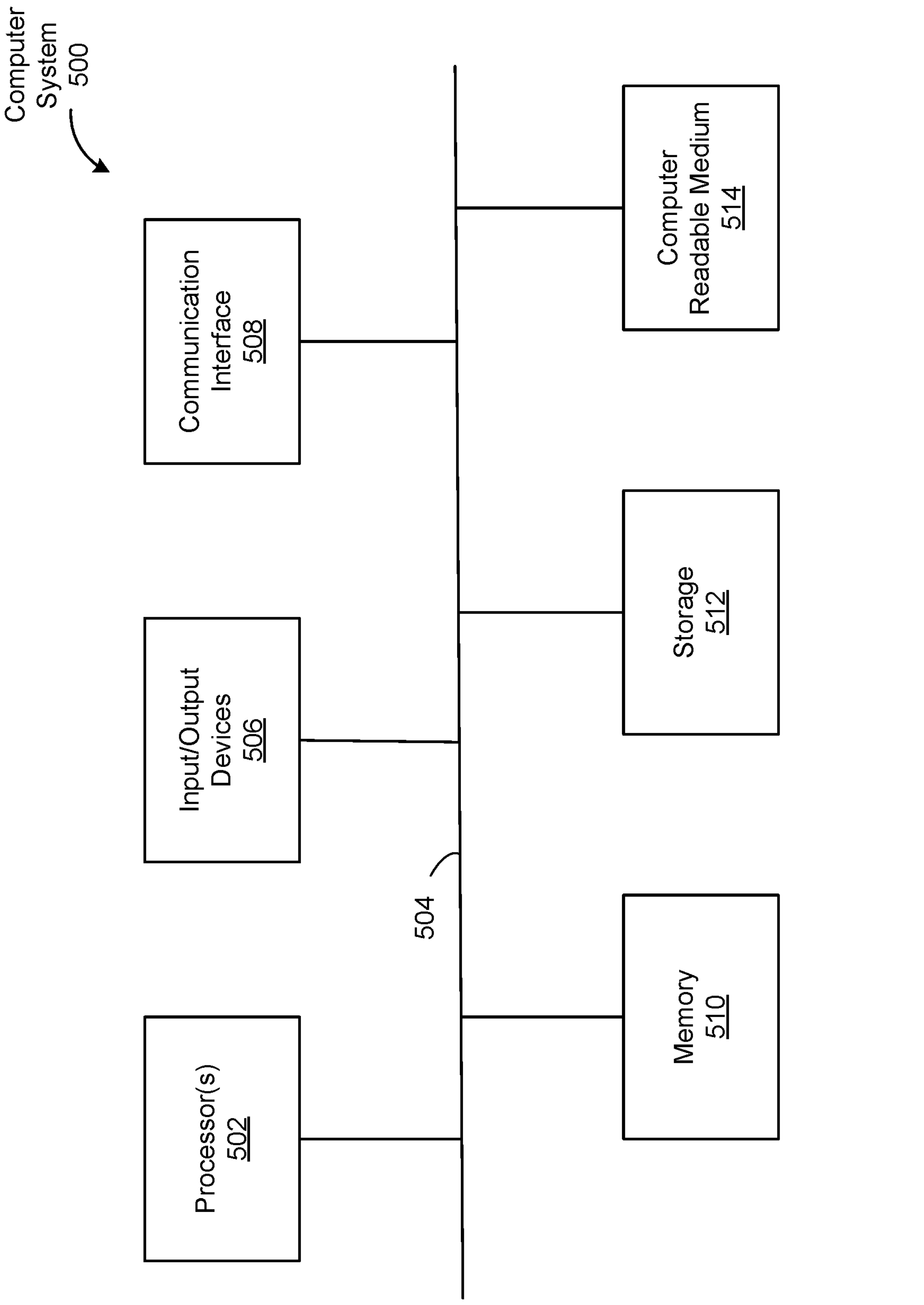
FIG. 5 is a block diagram of a computer system, in accordance with some embodiments of the present invention.

FIG. 5 is a block diagram of a computer system 500, in accordance with some embodiments of the present invention. In some embodiments, each of the screen 102, headphone systems 104, subwoofers 106, server system 108, directional transponders 110, and/or video equipment 112 may include an instance of the computer system 500.

Computer system 500 includes one or more hardware processor 502, such as an Intel Pentium® microprocessor or a Motorola Power PC® microprocessor, coupled to a communications channel 504. The computer system 500 further includes input/output devices 506 such as a keyboard, mouse and display device, coupled to the communication channel 504. The computer system 500 further includes a communication interface 508, memory 510 such as random access memory (RAM), a data storage device 512 such as optical, magnetic or semiconductor memories, and a computer-readable medium such as RAM, removable storage, permanent storage, temporary storage, etc., each coupled to the communication channel 504.

The communication interface 508 may be wired or wirelessly coupled to a network such as the wide-area network commonly referred to as the Internet or an internal network such as used by the cinema system 100. One skilled in the art will recognize that, although the data storage device 512 and memory 510 are illustrated as different units, the data storage device 512 and memory 510 can be parts of the same unit, distributed units, virtual memory, etc.

The data storage device 512 and/or memory 510 may store an operating system such as the Microsoft Windows, Linux, MAC OS, or other operating system and/or other programs. It will be appreciated that a preferred embodiment may also be implemented on platforms and operating systems other than those mentioned.

One skilled in the art will recognize that the computer system 500 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. The computer system 500 may receive programs and/or data via the computer-readable medium 514, the communication interface 508, or other device. It will be appreciated that the term "memory" herein is intended to cover all data storage media whether permanent or temporary.

Figure 6:
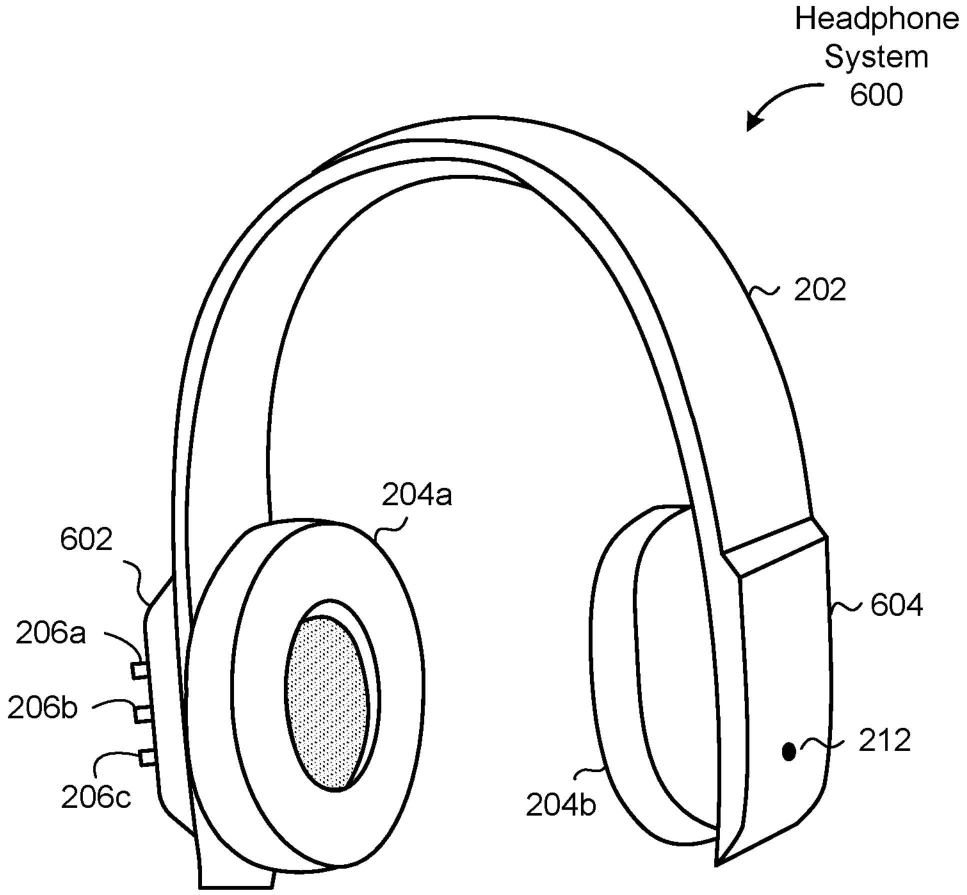
FIG. 6 is a diagram of a headphone system, in accordance with some embodiments of the present invention.

FIG. 6 is a diagram of a headphone system 600, in accordance with some embodiments of the present invention. The headphone system 600 may include an instance of headphone system 104. The headphone system 600 includes a headband 202, a left ear cup 204*a*, a right ear cup 204*b*, hardware controls 206*a*, 206*b* and 206*c*, one or more ambient microphones 212, and additional components (not shown) embedded in one or more housings, e.g., a housing 602 and/or a housing 604. Although only one ambient microphone 212 is shown on the headphone system 600, the headphone system 600 can have any number of ambient microphones 212. For example, the headphone system 600 may include one ambient microphone 212 located on the housing 602 and one ambient microphone located on the housing 604. For example, the headphone system 600 may include an ambient microphone 212 located on the headband 202.

The one or more housings 602 and 604 may house the additional components of the headphone system 104, such as the wireless receiver 208, the direction monitor 210 and the control system 214 (including all memory, processors, local storage, operating systems, drivers, noise cancellation/reduction filters, pairing mechanisms, encryption mechanisms, etc.).

Figure 7:
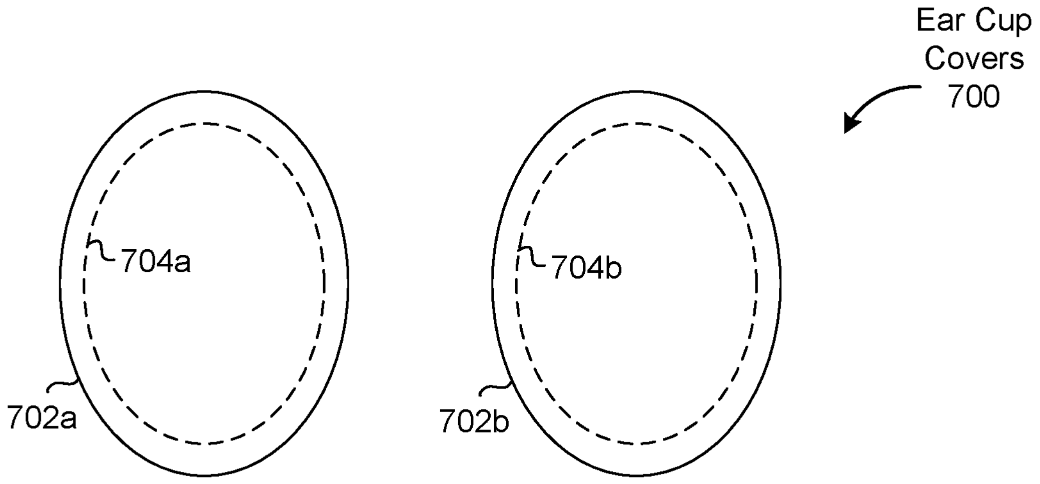
FIG. 7 is a diagram of a pair of ear cup covers, in accordance with some embodiments of the present invention.

FIG. 7 is an illustration of a pair of ear cup covers 700, in accordance with some embodiments of the present invention. As shown, ear cup covers 700 include a left ear cup cover 702*a* and a right ear cup cover 702*b*. The ear cup covers 702*a* and 702*b* may be identical or different based on the shape of the ear cups 204*a* and 204*b*. In some embodiments, each ear cup cover 702*a*/702*b* may include fabric and an elastic 704*a*/704*b* attached to the periphery. The fabric may be configured to cover the ear cup 204*a*/204*b* including the cushioned padding. The elastic 704*a*/704*b* may be configured to secure the fabric around the ear cup 204*a*/204*b* and hold the fabric on the exterior of the ear cup 702*a*/702*b* between the ear cup 702*a*/702*b* and the ear of the wearer, thereby to protect the wearer from any contamination on the headphone system 104.

Figure 8A:
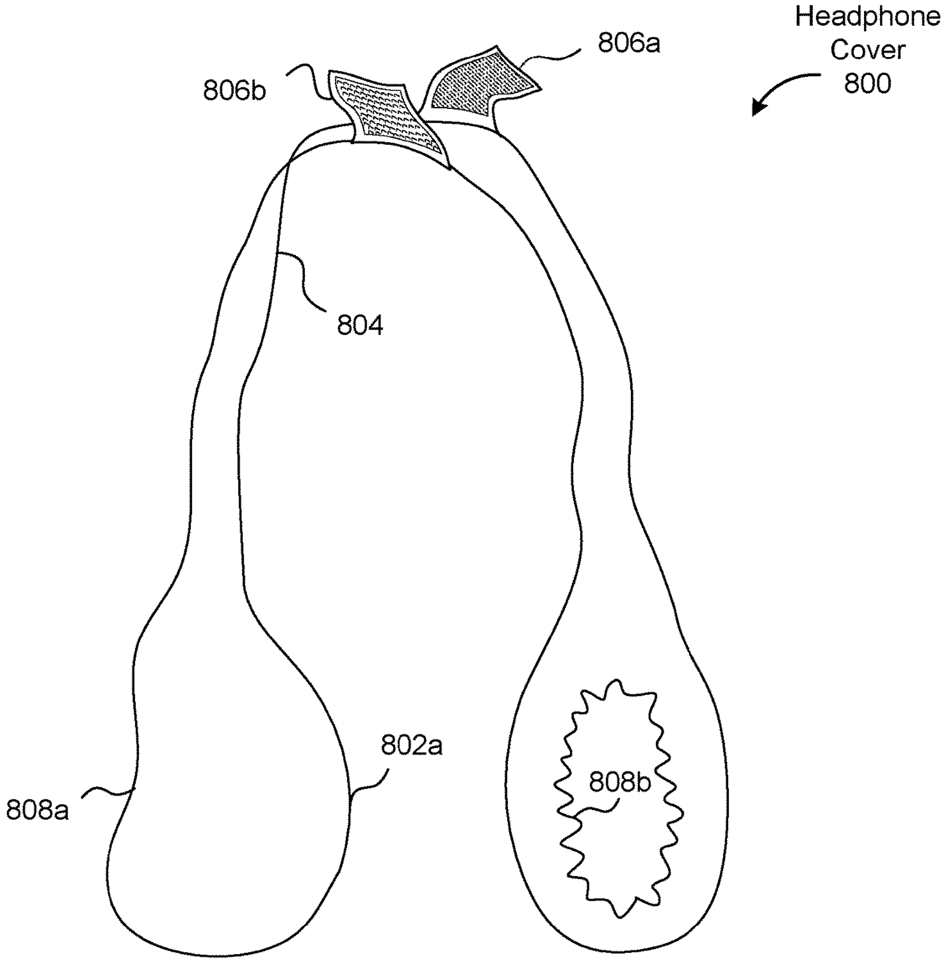
FIGS. 8A and 8B are diagrams of a headphone cover, in accordance with some embodiments of the present invention.
Figure 8B:
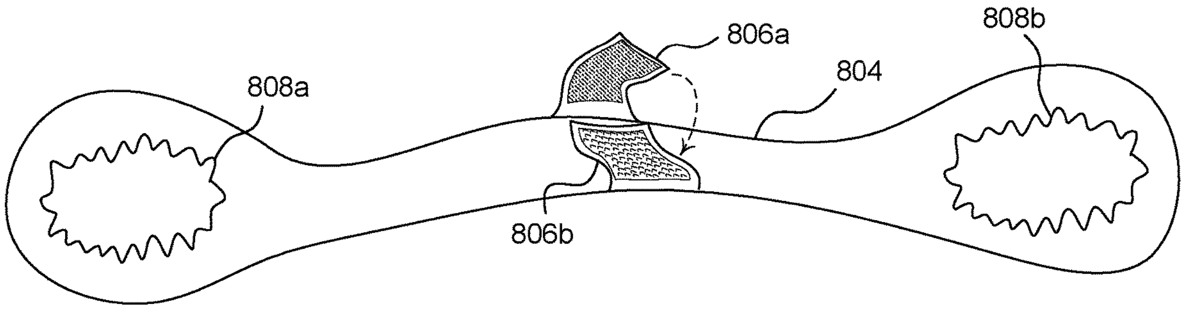

FIGS. 8A and 8B are illustrations of a headphone cover 800, in accordance with some embodiments of the present invention. The headphone cover 800 includes a left ear cup cover 802*a* (similar to ear cup cover 702*a*), a right ear cup cover 802*b* (similar to ear cup cover 702*b*), a headband cover 804*a*, and connectors 806*a* and 806*b*.

As shown, in some embodiments, the left ear cup cover 802*a* may be coupled to the headband cover 804 which may be coupled to the right ear cup cover 802*b*. In some embodiments, the left ear cup cover 802*a*, the headband cover 804 and the right ear cup cover 802*b* are formed from a single piece of fabric or from multiple pieces of fabric sewn together. Each ear cup cover 802*a*/802*b* may include a rubber band 808*a* (not shown) and a rubber band 808*b* configured to respectively secure the fabric around the ear cups 204*a* and 204*b* and to hold the fabric on the exterior of the ear cup 702*a*/702*b* between the ear cup 204*a*/204*b* and the ear of the wearer, thereby to protect the wearer from any contamination on the ear cups 204*a*/204*b* of the headphone system 104. As noted above, each ear cup cover 802*a*/802*b* need not be the same shape, although in some embodiments they may be the same.

In some embodiments, the connectors 806*a* and 806*b* may include one or more flaps that connect to each other to hold the headband cover 804 to the headband 202. In some embodiments, the connectors 806*a* and 806*b* may include Velcro™ type fasteners, although other fasteners such as snaps, buttons, clips, ties, etc. may be used. In some embodiments, the connectors include only a single flap that extend all the way over the headband 202 to be affixed to the headband cover 804. In some embodiments, there may be multiple connectors 806*a*/806*b* at different points along the headband cover 804. The connectors 806*a* and 806*b* may secure the headband cover 804 between the headband 202 and the head of the wearer, thereby to protect the wearer from any contamination of the headband 202 of the headphone system 104.

It will be appreciated that other configurations may be used. For example, the headphone cover 800 may include a sleeve that fully encases the headphone system 104. The headphone cover 800 may include separate parts, e.g., a left part that covers the left side of the headphone system 104, e.g., as a sleeve or covering, and a right part that covers the right side of the headphone system 104, e.g., as a sleeve or covering. In some embodiments, the left part and the right part have additional connectors that hold the left and right parts together.

Figure 9:
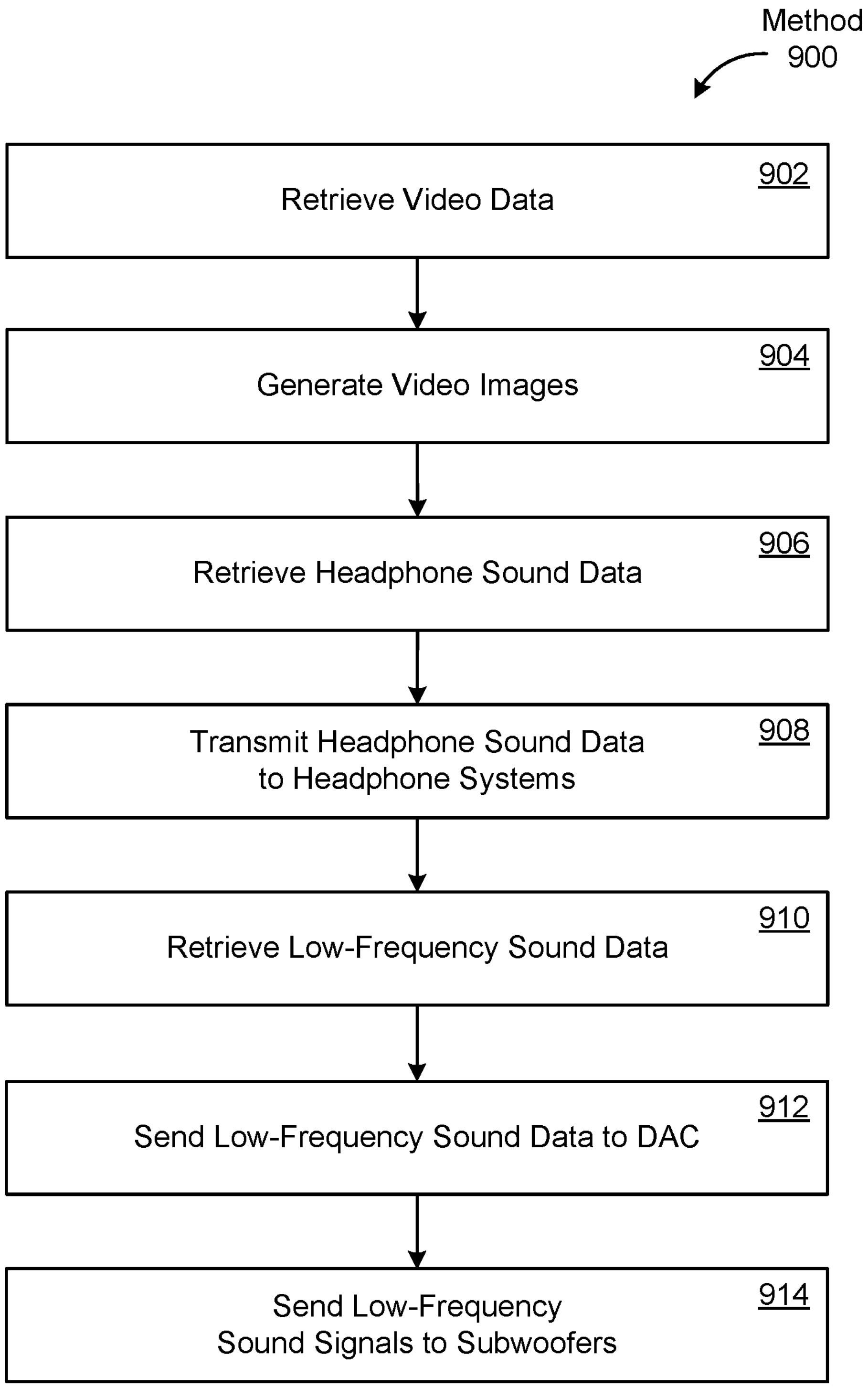
FIG. 9 is a flowchart of a method of delivering video and audio data to components of the cinema system of the present invention.

FIG. 9 is a flowchart of a method 900 of delivering video and audio data to components of the cinema system 100 of the present invention. The method 900 begins in step 902 with the server system 109 retrieving video data. In step 904, the video equipment 112 generates video images based on the video data for presentation on a screen, e.g., screen 102, in a cinema environment. In step 906, the server system 108 retrieves headphone sound data, and in step 908 transmits the headphone sound data to one or more headphone systems 104 located in the cinema environment. As indicated above, the one or more headphone systems 104 include left and right ear cups, each ear cup including at least one driver configured to drive highs and/or mids based on headphone sound signals and not configured to drive lows, the headphone sound signals corresponding to the video. Each ear cup does not include a low-frequency driver or a dynamic driver configured to provide lows. Each headphone system may include a first DAC configured to convert audio data to the headphone sound signals, and may include a control system configured to generate the audio data from at least headphone sound data. In step 910, the server system 108 retrieves low-frequency sound data, and in step 912 sends the low-frequency sound data to a second digital to analog converter configured to generate low-frequency speaker signals from the low-frequency speaker data. In step 914, the second DAC sends the low-frequency speaker signals to one or more one or more low-frequency speakers configured to drive lows based on the low-frequency speaker signals. In some embodiments, the second DAC may be located in the one or more low-frequency speakers. In some embodiments, the second DAC may be located on the server system.

Figure 10:
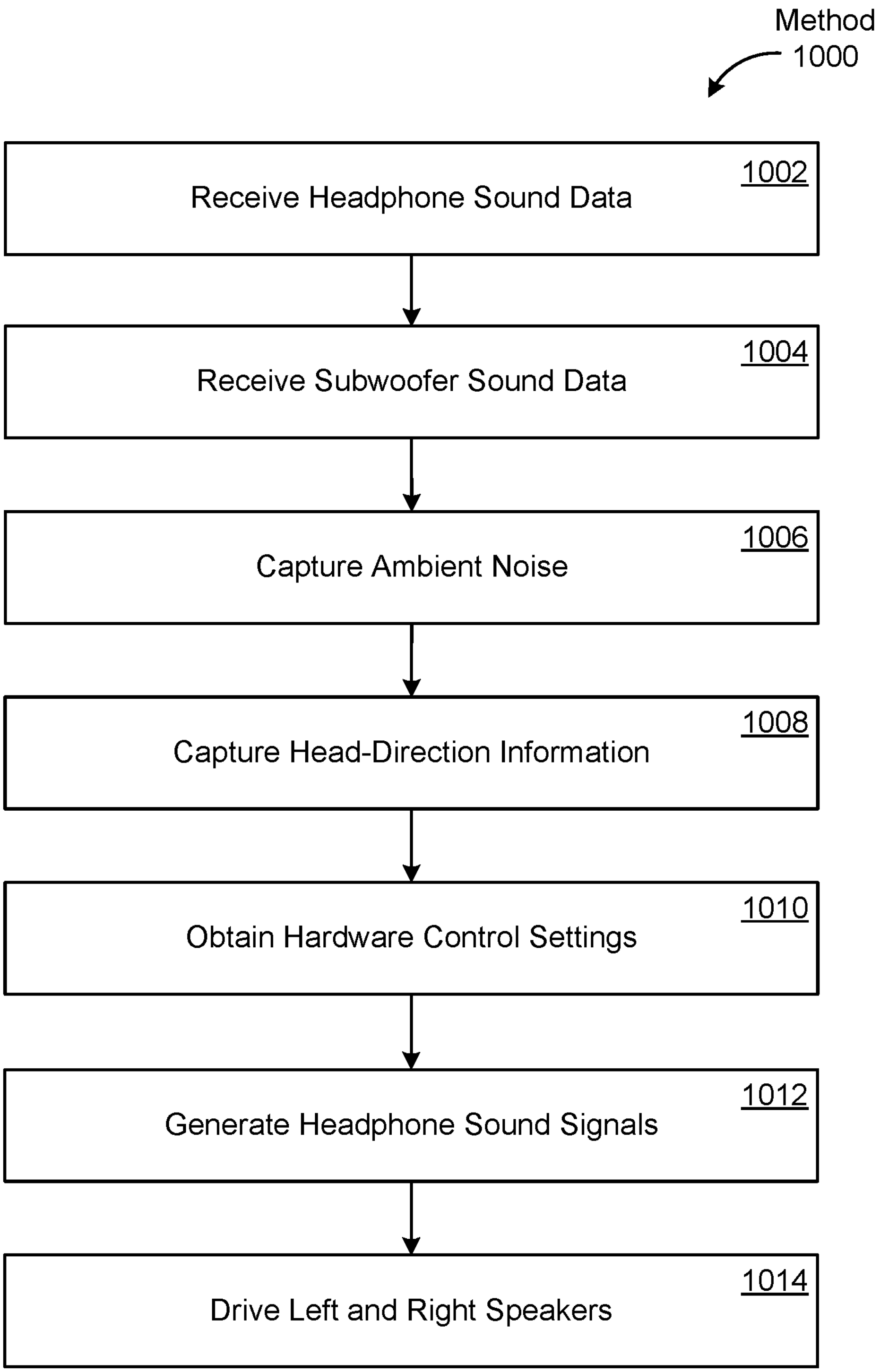
FIG. 10 is a flowchart of a method of generating left and right speaker sound in a headphone system, in accordance with some embodiments of the present invention.

FIG. 10 is a flowchart of a method 1000 of generating left and right speaker sound in a headphone system 104, in accordance with some embodiments of the present invention. Method 1000 begins in step 1002 with the wireless receiver 208 and communication interface 302 of the headphone system 104 receiving the headphone sound data from the server system 108. The communication interface 302 may have previously paired with the server system 108 using a proprietary pairing protocol and/or may communicate with the server system 108 using secure encryption, to ensure that the headphone system 104 can only communicate with the server system 108. In step 1004, in some embodiments, the wireless receiver 208 and communication interface 302 of the headphone system 104 receives the subwoofer sound data from the server system 108. In step 1006, in some embodiments, the ambient microphone 212 captures ambient noise. In step 1008, in some embodiments, the direction monitor 210 captures head-direction information, e.g., using transponders 110*a* and 110*b*, although other head-direction mechanisms may be used. In step 1010, in some embodiments, the hardware (and/or software) controls 206 may capture control settings, such as volume and noise reduction level. In step 1012, the sound processor 306 generates processed audio data from the headphone sound data and, in some embodiments, from the subwoofer sound data, the captured ambient noise, the head-direction information, and/or the hardware and/or software control settings. The first DAC 314 generates left and right headphone sound signals from the processed audio data. In step 1014, the DAC 314 provides the left headphone sound signals to the left speaker in the left ear cup, and provides the right headphone sound signals to the right speaker in the right ear cup 204.

The foregoing description of the preferred embodiments of the present invention is by way of example only, and other variations and modifications of the above-described embodiments and methods are possible in light of the foregoing teaching. Although the nodes are being described as separate and distinct sites, one skilled in the art will recognize that the nodes may be a part of an integral site, may each include portions of multiple sites, or may include combinations of single and multiple sites. Various components herein may be implemented utilizing hardware, software and/or firmware. Any type of logic which is capable of implementing the various functionality set forth herein may be utilized. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting.

The invention claimed is:

1. A cinema system, comprising:

a screen;

video equipment configured to generate video images for presentation on the screen, the video images being based on video data;

one or more headphone systems, each headphone system including left and right ear cups, each ear cup including at least one driver configured to drive highs and/or mids based on headphone sound signals and not configured to drive lows, each ear cup not including a low-frequency driver or a dynamic driver configured to provide lows, the headphone sound signals corresponding to the video;

a first digital to analog converter configured to convert audio data based on the headphone sound data to the headphone sound signals; and a control system configured to generate the audio data from at least headphone sound data, the control system also configured to provide a user-adjustable ambient noise cancellation;

one or more low-frequency speakers configured to drive lows based on low-frequency speaker signals;

a second digital to analog converter configured to generate the low-frequency speaker signals from low-frequency speaker data; and a server system configured to assist in providing the video data to the video equipment, the headphone sound data to the one or more headphone systems, and the low-frequency speaker data to the second digital to analog converter;

wherein the control system is in digital communication with the server system to receive data corresponding to the low-frequency sound data therefrom, the control system further configured to inhibit noise cancellation of know lows emanating from the one or more low-frequency speakers based on the data corresponding to the low-frequency sound data.

2. The cinema system of claim 1, wherein the one or more low-frequency speakers includes one or more subwoofers.

3. The cinema system of claim 1, wherein the second digital to analog converter is located in at least one or more low-frequency speakers.

4. The cinema system of claim 1, wherein the second digital to analog converter is located at the server system.

5. The cinema system of claim 1, wherein at least one of the one or more headphone systems includes one or more hardware controls configured to control volume of the highs and/or mids.

6. The cinema system of claim 1, wherein the servers system and each of the one or more headphone systems includes a communications interface configured to assist in pairing the one or more headphone systems to the server system.

7. The cinema system of claim 6, wherein the communications interface on each of the one or more headphone systems is configured only to pair with the server system such that the each headphone systems is usable only with the server system.

8. The cinema system of claim 1, wherein the server system and each of the one or more headphone systems includes an encryption engine configured to assist in encrypting data communications between the one or more headphone systems and the server system such that each headphone system can only be used in a specific theater at a specific time.

9. The cinema system of claim 8, wherein the encryption engine on each of the one or more headphone system is configured only to encrypt the data communications using an encryption key dedicated to the server system.

10. The cinema system of claim 1, further comprising:

a plurality of directional transponders configured to transmit ping signals, spaced apart from the one or more headphone systems;

wherein, each headphone system includes a direction monitor configured to capture ping signals from the plurality of directional transponders to determine head direction of the wearer based on the ping signals, and the control system is further configured to process the headphone sound data to control the direction of sound presented to the wearer based on the head direction.

11. A method, comprising:

retrieving video data;

generating video images based on the video data for presentation on a screen in a cinema environment;

retrieving headphone sound data;

transmitting the headphone sound data to one or more headphone systems located in the cinema environment, the one or more headphone systems including left and right ear cups, each ear cup including at least one driver configured to drive highs and/or mids based on headphone sound signals and not configured to drive lows, each ear cup not including a low-frequency driver or a dynamic driver configured to provide lows, the headphone sound signals corresponding to the video;

a first digital to analog converter configured to convert audio data to the headphone sound signals a direction monitor; and a control system configured to generate the audio data from at least headphone sound data, the control system also configured to provide a user adjustable ambient noise cancellation;

retrieving low-frequency sound data;

transmitting the low-frequency sound data to a second digital to analog converter configured to generate low-frequency speaker signals from the low-frequency speaker data, the low-frequency sound signals corresponding to the video; and transmitting the low-frequency speaker signals to one or more one or more low-frequency speakers configured to drive lows based on the low-frequency speaker signals:

transmitting data corresponding to the low-frequency sound data to the one or more headphone systems located in the cinema environment, the control system further configured to inhibit noise cancellation of know lows emanating from the one or more low-frequency speakers based on the data corresponding to the low-frequency sound data.

12. The method of claim 11, wherein the second digital to analog converter is located in at least one or more low-frequency speakers.

13. The method of claim 11, wherein the second digital to analog converter is located at a server system remote from the one or more low-frequency speakers.

14. The method of claim 11, further comprising pairing the one or more headphone systems to a server system that performs the transmitting the headphone sound data.

15. The method of claim 14, further comprising enabling the one or more headphone systems to pair with only the server system.

16. The method of claim 11, further comprising encrypting data communications between the one or more headphone systems and a server system.

17. The method of claim 16, further comprising enabling the one or more headphone systems to encrypt the data communications using an encryption key dedicated to the server system.

18. A cinema system, comprising:

a screen;

video equipment configured to generate video images for presentation on the screen, the video images being based on video data;

one or more headphone systems, each headphone system including left and right ear cups, each ear cup including at least one driver configured to drive highs and/or mids based on headphone sound signals and not configured to drive lows, each ear cup not including a low-frequency driver or a dynamic driver configured to provide lows, the headphone sound signals corresponding to the video;

a first digital to analog converter configured to convert audio data based on the headphone sound data to the headphone sound signals;

a direction monitor configured to determine head direction of the wearer; and a control system configured to generate the audio data from at least headphone sound data, the control system also configured to provide ambient noise cancellation;

one or more low-frequency speakers configured to drive lows based on low-frequency speaker signals, the control system further configured to process the headphone sound data to control the direction of sound presented to the wearer based on the head direction;

a second digital to analog converter configured to generate the low-frequency speaker signals from low-frequency speaker data; and a server system configured to assist in providing the video data to the video equipment, the headphone sound data to the one or more headphone systems, and the low-frequency speaker data to the second digital to analog converter.

19. The cinema system of claim 18, further comprising:

a plurality of directional transponders configured to transmit ping signals, spaced apart from the one or more headphone systems;

wherein, the direction monitor of each headphone system is configured to capture ping signals from the plurality of directional transponders to determine head direction of the wearer based on the ping signals.

20. The cinema system of claim 18, wherein the control system is in digital communication with the server system to receive data corresponding to the low-frequency sound data therefrom, the control system further configured to inhibit noise cancellation of know lows emanating from the one or more low-frequency speakers based on the data corresponding to the low-frequency sound data.

* * * * *